United States Patent [19]
Peters

[11] Patent Number: 5,630,951
[45] Date of Patent: May 20, 1997

[54] METHODS AND APPARATUS FOR MAKING HONEYCOMB EXTRUSION DIES

[75] Inventor: W. Neil Peters, Corning, N.Y.

[73] Assignee: Corning Incorporated, Corning, N.Y.

[21] Appl. No.: 440,870

[22] Filed: May 15, 1995

[51] Int. Cl.⁶ .................. B23H 1/10; B23H 7/02; B23H 9/00
[52] U.S. Cl. .................. 219/69.12; 219/69.14
[58] Field of Search .............. 219/69.12, 69.17, 219/69.14; 425/461, 463, 464

[56] References Cited

U.S. PATENT DOCUMENTS

| | | | |
|---|---|---|---|
| 3,790,654 | 2/1974 | Bagley . | |
| 4,251,706 | 2/1981 | Frei et al. | 219/69.14 |
| 4,263,493 | 4/1981 | Kilcher | 219/69.14 |
| 4,403,131 | 9/1983 | Cunningham et al. | 219/69.14 |
| 4,527,035 | 7/1985 | Majestic | 219/69.12 |
| 4,902,216 | 2/1990 | Cunningham et al. | 425/463 |
| 5,320,721 | 6/1994 | Peters . | |
| 5,322,599 | 6/1994 | Peters . | |
| 5,408,063 | 4/1995 | Onishi | 219/69.14 |

FOREIGN PATENT DOCUMENTS

| | | | |
|---|---|---|---|
| 59-152026 | 8/1984 | Japan | 219/69.14 |
| 62-277223 | 12/1987 | Japan | 219/69.14 |

Primary Examiner—Geoffrey S. Evans
Attorney, Agent, or Firm—Kees van der Sterre

[57] ABSTRACT

A steel honeycomb extrusion die having an array of feedholes extending into a die inlet face and intersecting with an array of discharge slots on the die discharge face is made by a process wherein the slots are cut into blind feedholes by wire EDM slotting while dielectric fluid is provided in or flushed through the feedholes. The resulting improvements in EDM process stability reduce the number of wire electrodes broken during machining of the array, and in feedhole/slot intersection configuration and finish, provide dies with improved extrusion performance and extended service life.

6 Claims, 1 Drawing Sheet

METHODS AND APPARATUS FOR MAKING HONEYCOMB EXTRUSION DIES

BACKGROUND OF THE INVENTION

The present invention relates to extrusion dies for the extrusion of honeycomb structures from plasticized powder batches. More particularly the invention relates to improved methods for making such extrusion dies at lower cost and in higher quality, and to the resulting dies and their use in honeycomb extrusion.

Ceramic and metallic honeycomb structures for applications such as catalyst substrates, honeycomb heaters, and the like are presently manufactured in large quantities by extrusion methods. The extrusion dies used in these processes are typically configured as flat plates comprising an inlet face for introducing a plasticized batch material to be extruded and a discharge face from which the extrudate is discharged in the form of a honeycomb.

The discharge face of a typical honeycomb extrusion die incorporates an array of shallow criss-crossing discharge slots from which the batch material emerges as an interconnected wall structure forming the cell walls of the honeycomb. The inlet face comprises an array of feedholes extending from the face inwardly toward and connecting with the bases of at least some of the discharge slots. The feedholes provide the means for supplying the slots with the batch material to be extruded. U.S. Patent No. 3,790,654 to Bagley describes honeycomb extrusion dies of this type and their use for the extrusion of honeycombs; reference may be made to that patent for a further description of these processes.

For the high volume extrusion of thin-walled ceramic honeycombs, such as the honeycombs used for the support of automotive exhaust antipollution catalysts, extrusion dies fabricated of stainless steel are presently employed. To form the fine discharge slot arrays required for the production of these thin-walled ceramics, traveling wire electrical discharge machining (wire EDM) is the process which is presently preferred.

The wire EDM process is a metal removal technique which uses electricity to erode material from a work piece. Rapid DC electrical pulses between a negative traveling wire electrode and a positively biased workpiece, through a deionized (DI) water dielectric flushing medium, precisely melt the steel material from the workpiece. This material resolidifies in and is flushed away by a pressurized jet of the DI water flushing medium.

The flushing away of the removed material is critical to EDM process stability and the accuracy of the cut slot. The wire electrode used in wire EDM processing is typically made of brass, copper or molybdenum. As this electrode is advanced into the work piece, by means of a servo system or other apparatus, the control system for the apparatus maintains a pre-set gap between the electrode and workpiece so that a very precise slot can be formed. The presence of debris in this slot can seriously interfere with slot precision, and can also result in wire breakage which further degrades the smoothness and/or uniform width of the slot.

One difficulty which has been encountered in the fabrication of extrusion dies by wire EDM machining is excessive levels of wire breakage during the slotting of these dies. The incidence of wire breakage observed has been significantly greater than experience with slot cutting in other wire EDM applications would indicate.

It therefore is a principal object of the present invention to provide an improved die fabrication method which provides more stable EDM processing and thus extrusion dies of improved slot quality and precision.

It is a further object of the invention to provide improved extrusion dies and a method for their use.

Other objects and advantages of the invention will become apparent from the following description thereof.

SUMMARY OF THE INVENTION

In accordance with the invention improvements in methods and apparatus for wire EDM slotting are provided which greatly reduce the incidence of EDM wire breakage during the slotting of steel honeycomb extrusion dies. Thus die fabrication procedures are enabled which result in dies with smoother and more uniform discharge slots, offering improved extrusion performance and reduced die wear in use.

In a first aspect the invention resides in a method for making a honeycomb extrusion die which comprises, first, providing a steel die body having an array of feedholes extending into the body from an inlet face toward a discharge face thereon. Into the discharge face of this die body is then machined an array of discharge slots, machining being by the wire EDM removal of steel from pre-selected slot locations on the die.

During the process of EDM machining, a dielectric fluid is used to flush machined material from the die body and from the slot being formed by the traveling wire. This flushing is continued at least until hole-slot intersections between the feedholes and at least some of the discharge slots are formed.

To stabilize the EDM process and reduce the incidence of wire breakage during slotting, a dielectric fluid is provided within the feedholes in the die body at least while the hole-slot intersections are being formed, i.e., as breakthrough of the slots into the feedholes is achieved. In the preferred embodiment of the invention, this fluid is provided by venting the feedholes on the inlet face of the die body, so that flushing of the feedholes with the same dielectric fluid being used to flush the discharge face and slot being machined will occur.

In an alternative embodiment, dielectric flushing fluid can be provided in the feedholes by introducing the fluid into the inlet face of the die body prior to the time the hole/slot intersections are being formed. The fluid used in this embodiment of the invention can be the same as or different from the fluid being used during the slotting process to flush the die body and slot on the discharge face of the die.

The invention further includes apparatus for supporting a die body during EDM processing as above described. That apparatus comprises, first, a holding fixture for holding a die body incorporating blind feedholes on its inlet face in proximity to a traveling wire EDM electrode during EDM slotting of its outlet face. In addition, apparatus comprises venting means for venting the feedhole openings in the inlet face of the die. Such venting means may comprise openings in the holding fixture or, more preferably, a vented frame plate or spacer for spacing the inlet face of the die body away from the holding fixture during the machining process.

DESCRIPTION OF THE DRAWINGS

The invention may be further understood by reference to the drawings, wherein.

DETAILED DESCRIPTION

Figure 1:
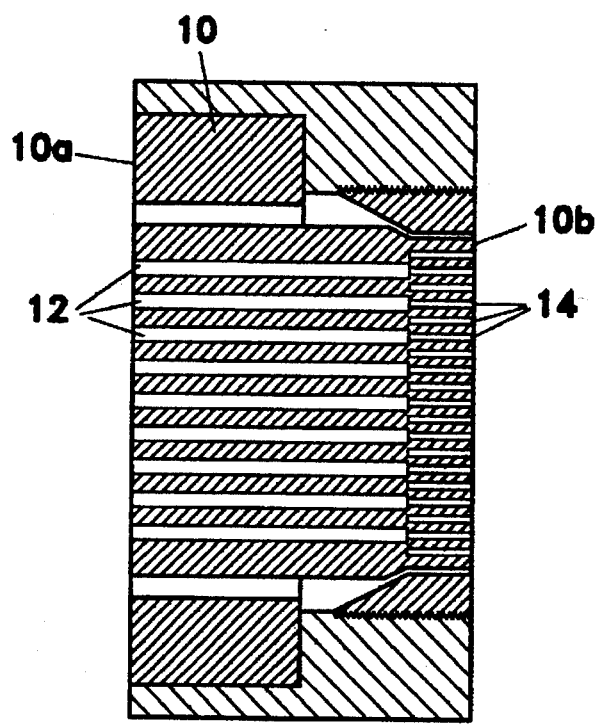
FIG. 1 is a schematic elevational view in cross-section of a honeycomb extrusion die.

FIG. 1 of the drawing provides a schematic cross-sectional elevational illustration of an extrusion die of the kind which may be fabricated in accordance with the invention. Referring more particularly to FIG. 1, such dies comprise a die body 10 which includes an inlet face 10a and an outlet face 10b. Inlet face 10a is provided with an array of feedholes 12 which extend into the body from the inlet face 10a toward the outlet or discharge face 10b. The discharge face incorporates an array of discharge slots 14 which forms the honeycomb product being extruded.

In the conventional fabrication of a die of this type, wire EDM processing is used to form discharge slots 14 in the outlet face 10b of a die body of selected composition, these slots being machined to a predetermined depth prior to the formation of any feedholes. Thereafter, feedholes 12 are mechanically or chemically drilled to intersect the previously formed discharge slots 14, in order to provide the necessary path for batch flow from the feedholes to the discharge slots. U.S. Pat. Nos. 5,322,599 and 5,320,721, expressly incorporated herein by reference, describe electrochemical drilling procedures useful in the practice of this process.

One disadvantage in this conventional approach is that distortion of the slot-feedhole interface can occur as breakthrough of the feedholes into the slots occurs. This is typified by a fluctuation, typically a necking-down, in the diameter of each feedhole at the feedhole/slot intersection.

In accordance with the present invention, then, the sequence of slot and feedhole machining is reversed to insure a smooth hole/slot transition. The feedholes 12 are provided first in die body 10, and then discharge slots 14 are machined into the discharge face thereof after the feedholes have been provided. This provides a feedhole of invariant diameter at the slot/feedhole intersection.

To obtain slot interconnection with the pre-drilled feedholes, the discharge slots to be provided in accordance with the present process are machined to a depth such that at least some of the slots will intersect the feedholes 12. As is well known, the number and location of slots intersected by feedholes will depend on the design of the die. In dies such as provided in accordance with U.S. Pat. No. 3,790,654, all slots are typically intersected by feedholes, while in so-called "compound slot" dies such as shown in U.S. Pat. No. 4,902,216, only a selected fraction of the slots intersect feedholes.

Figure 2:
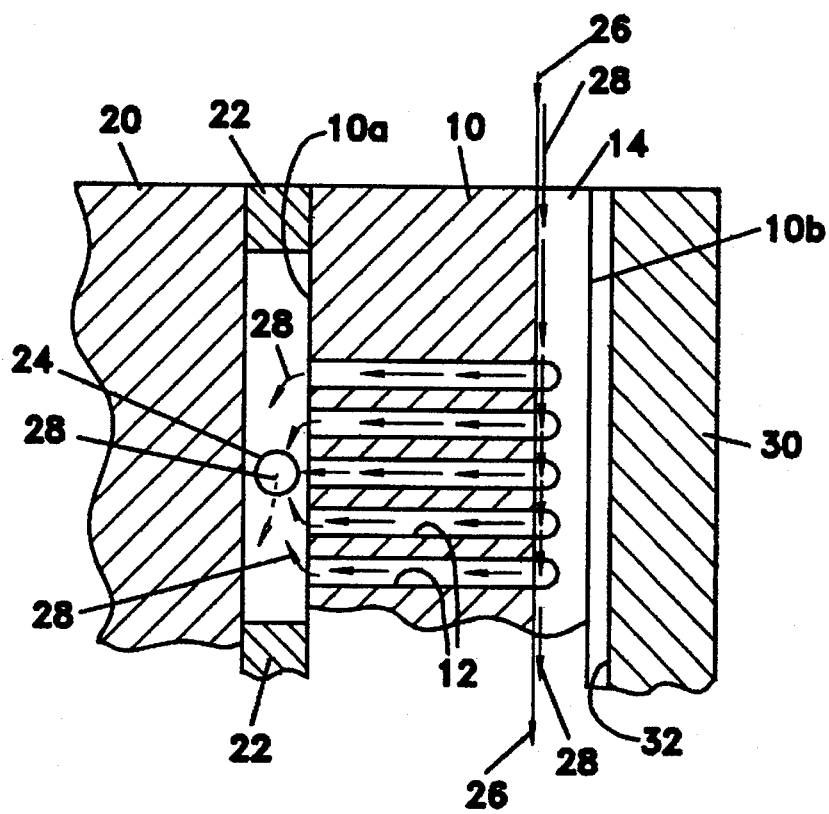
FIG. 2 is a partial schematic elevational view in cross-section of apparatus for the machining of a die body by traveling wire EDM processing in accordance with the invention.

The method of manufacture of a die such as shown in FIG. 1 is illustrated in more detail in FIG. 2 of the drawing. As shown in FIG. 2, die body 10 is mounted on vertically disposed supporting holding fixture 20 by any suitable attachment means, such as by bolts (not shown) extending through the fixture to support a workpiece. However, interposed between die body 10 and holding fixture 20 is vented frame plate 22. Plate 22 incorporates one or more vents 24 disposed between die body 10 and the holding plate 20, for the discharge of flushing fluid as hereinafter more fully described.

To machine each discharge slot 14 (shown in the plane of the drawing in FIG. 2) in die body 10, a electrical discharge wire 26 fed by a wire EDM apparatus of conventional type (not shown) is cause to traverse downwardly across discharge face 10b to remove material from die body 10. Concurrently, to flush away the material being removed from the die body by wire 26, a dielectric flushing fluid such indicated by arrows 28 is caused to flow downwardly across discharge face 10b and through slot 14 as that slot is being formed. To direct this fluid effectively over the die body and slot surfaces, a trough member 30 with interior channel 32 is positioned against die body 10, as illustrated in FIG. 2 and in U.S. Pat. No. 4,527,035, expressly incorporated herein by reference.

Ultimately, as shown in FIG. 2, slot 14 reaches a depth where it breaks through into feedholes 12. It is at this point in the EDM process when wire electrode breakage is most likely to occur. Investigations leading to the present invention suggest that the most likely cause of this wire breakage is residue from the hole-drilling process and/or air trapped at the ends of the feedholes.

Figure 3:
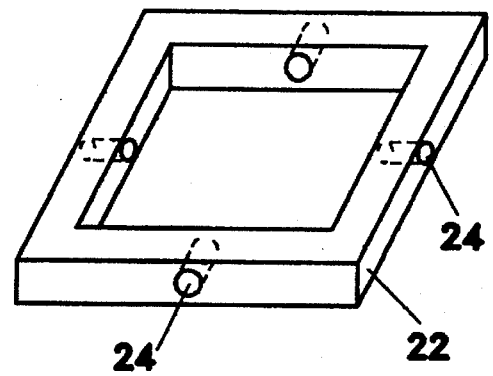
FIG. 3 is a schematic perspective illustration of venting means useful in the apparatus of FIG. 2.

Referring again to FIG. 2, in order to improve process stability and minimize wire breakage, frame plate 22 is interposed between die body 10 and holding fixture 20. This plate, having a configuration as generally shown in FIG. 3, spaces inlet face 10a of die body 10 away from holding fixture 20. In addition, being provided with vents such as vent 24, frame 22 provide a path for the egress of flushing fluid exiting feedholes 12 and entering the interior of the frame. Thus the interposition of the frame plate insures that the openings at the bases of feedholes 12 on inlet face 10a of die body 10 remain open.

As soon as discharge wire 26 reaches the depth where it intersects the terminations of feedholes 12 within die body 10, dielectric flushing fluid 28 can begin to enter feedholes 12. That fluid then begins to flush air and/or any debris remaining from feedhole drilling out of the bases of feedholes 12 and into the space formed by frame plate 22. Further, this fluid together with debris and/or air carried thereby entering that space is quickly discharged from vents 24. This flushing action has proven unexpectedly effective in reducing the number of disruptions in the slotting process caused by the breakage of wire 26.

As indicated above, a suitable construction for frame plate 22 is illustrated in FIG. 3. In its essential form, frame plate 22 simply consists of a metal spacer or peripheral frame member of a predetermined thickness. Through the edges of the frame are drilled a selected number of vent holes 24 to provide easy fluid egress from the space bounded by the frame. The thickness of the frame and the number of vent holes can readily be adjusted by routine experiment to handle fluid effluent from any selected set of wire EDM slotting conditions.

Depending on EDM machining rate, the condition of the feedholes, and other factors, it is not always necessary to maintain a high flushing fluid flow rate at the point of breakthrough of the slots into the feedholes. In some cases it is instead sufficient, prior to the commencement of the EDM slotting operation, to simply fill the feedhole array with water or other dielectric flushing fluid. This can be achieved, for example, by immersing die body 10, or at least the feedhole terminations on inlet face 10a thereof, into a dielectric flushing fluid while drawing a vacuum on the immersed die body and fluid. The vacuum aids in the extraction of air present in feedholes 12, allowing those feedholes to fill with the flushing fluid as the vacuum is released. When so filled, breakthrough of the EDM wire into feedholes 12 is again much less likely to cause wire breakage than breakthrough when the feedholes retain only air.

Dies such as shown in FIGS. 1 and 2 may be formed of any suitable metal but the preferred metals comprise stainless steels. These metals can be machined with precision by EDM slotting techniques, and in addition are highly resistant to corrosion by water, other dielectric flushing fluids, and liquid or dissolved solid components present in any batch materials formulated for extrusion through the dies. Typically, the dielectric flushing fluid used for EDM processing is deionized water, although other dielectric fluids could be substituted for water if desired.

A stainless steel honeycomb extrusion die made in accordance with the above described procedures offers structural characteristics of significant advantage for the manufacture of ceramic honeycombs by extrusion. Most importantly, the feedholes arrayed to intersect with and supply batch material to the array of discharge slots are of substantially invariant or constant diameter at their points of intersection with the discharge slots, reducing die wear and impedance to batch flow through the die. Thus the extrusion of plasticized ceramic batch material through the die is facilitated, and the resulting green ceramic honeycombs can be conventionally dried and fired to honeycomb products of high dimensional precision at higher select rates.

Tables 1 and 2 below set forth process statistics for the wire EDM processing of a number of extrusion dies made from stainless steel die blanks. Table 1 includes results from the production of dies in accordance with a practice wherein no provision for feedhole filling or venting was made, while Table 2 includes results for the processing of a similar number of dies using the process depicted in FIG. 2 of the drawing.

Each of the Tables includes an identification number for each die, counts of the number of EDM wire breaks encountered during the machining of slot arrays along first and second axes across the discharge face of the die, and a count of the total number of wire breaks during the machining of these arrays.

TABLE I

| | No Feedhole Flush/Fill | | |
|---|---|---|---|
| Die Number | 1st Axis Wire Breaks | 2nd Axis Wire Breaks | Total Wire Breaks |
| 1 | 8 | 9 | 17 |
| 2 | 16 | 3 | 19 |
| 3 | 11 | 2 | 13 |
| 4 | 15 | 7 | 22 |
| 5 | 32 | 9 | 41 |
| 6 | 2 | 18 | 20 |
| 7 | 12 | 12 | 24 |
| | | | Total 156 |

The data presented in Table 1 clearly show significant levels of traveling wire breakage when the machining of slots in a previously drilled die blank is attempted without giving attention to the slot/feedhole breakthrough phase of the process. Debris and/or air in the feedholes may be responsible for these levels of breakage.

TABLE 2

| | Feedhole Flushing | | |
|---|---|---|---|
| Die Number | 1st Axis Wire Breaks | 2nd Axis Wire Breaks | Total Wire Breaks |
| 8 | 4 | 1 | 5 |
| 9 | 3 | 0 | 3 |
| 10 | 7 | 0 | 7 |
| 11 | 0 | 2 | 2 |
| 12 | 11 | 0 | 11 |
| 13 | 10 | 0 | 10 |
| 14 | 3 | 1 | 4 |
| | | | Total 42 |

As the data in Table 2 indicate, providing a flushing frame between the die body and die holder during machining, thus securing the effective flushing of the feedhole/slot intersections with dielectric flushing fluid at the point of wire breakthrough, significantly reduces the incidence of wire breakage in this process.

The result of feedhole filling or flushing in accordance with the above-described procedures is a significant improvement in EDM process stability, thus an improvement in machined die quality. In addition to a substantially invariant feedhole diameter at the slot/feedhole intersection, resulting from cutting the die discharge slots into the feedholes instead of the feedholes into the slots, the extrusion dies provided by the inventive process exhibit improved slot uniformity and finish. Again, this improves the stability of the extrusion process and the quality of the extruded substrates.

I claim:

1. A method for making a honeycomb extrusion die comprising;

providing a die body having an array of feedholes extending into the body from an inlet face toward a discharge face thereon;

forming an array of discharge slots on the discharge face by wire electrical discharge machining removal and dielectric fluid flushing of material from the die body, such electrical discharge machining removal and flushing being continued at least until hole-slot intersections between the feedholes and some of the discharge slots are formed; and while the hole-slot intersections are being formed, providing a dielectric fluid in the feedholes.

2. A method in accordance with claim 1 wherein, while the hole-slot intersections are being formed, the feedholes are vented at the inlet face of the die body and flushing of the feedholes with the dielectric fluid occurs.

3. A method in accordance with claim 1 wherein the dielectric fluid is introduced into the feedholes prior to the time hole-slot intersection is achieved.

4. Apparatus for the wire electrical discharge machining slotting of a honeycomb extrusion die from a die body incorporating a plurality of blind feedholes in an inlet face of the body which comprises:

a die holding fixture;

a traveling wire electrode for machining discharge slots intersecting with the feedholes in the discharge face of the die body;

means for flushing the discharge face and discharge slots with dielectric flushing fluid; and means for venting the blind feedholes.

5. Apparatus in accordance with claim 4 wherein the means for venting the blind feedholes comprises means for spacing the die body from the die holding fixture.

6. Apparatus in accordance with claim 5 wherein the means for spacing the die body from the die holding fixture comprises a vented frame plate.

* * * * *